March 7, 1950  L. B. WRIGHT  2,499,442
UNLOADING APPARATUS FOR AUTOMOTIVE TRUCKS
Filed Dec. 12, 1947  3 Sheets-Sheet 1
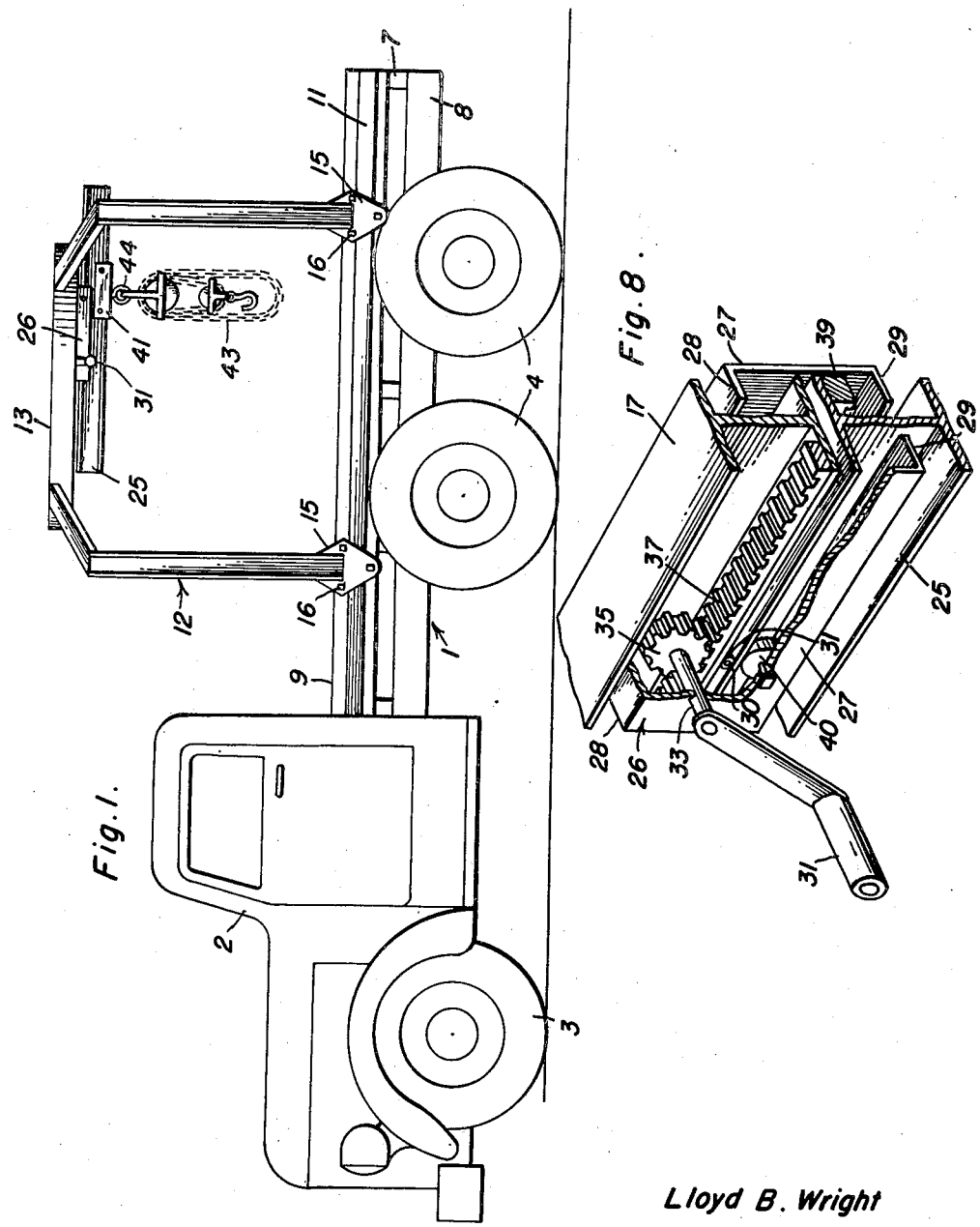
Lloyd B. Wright
INVENTOR.

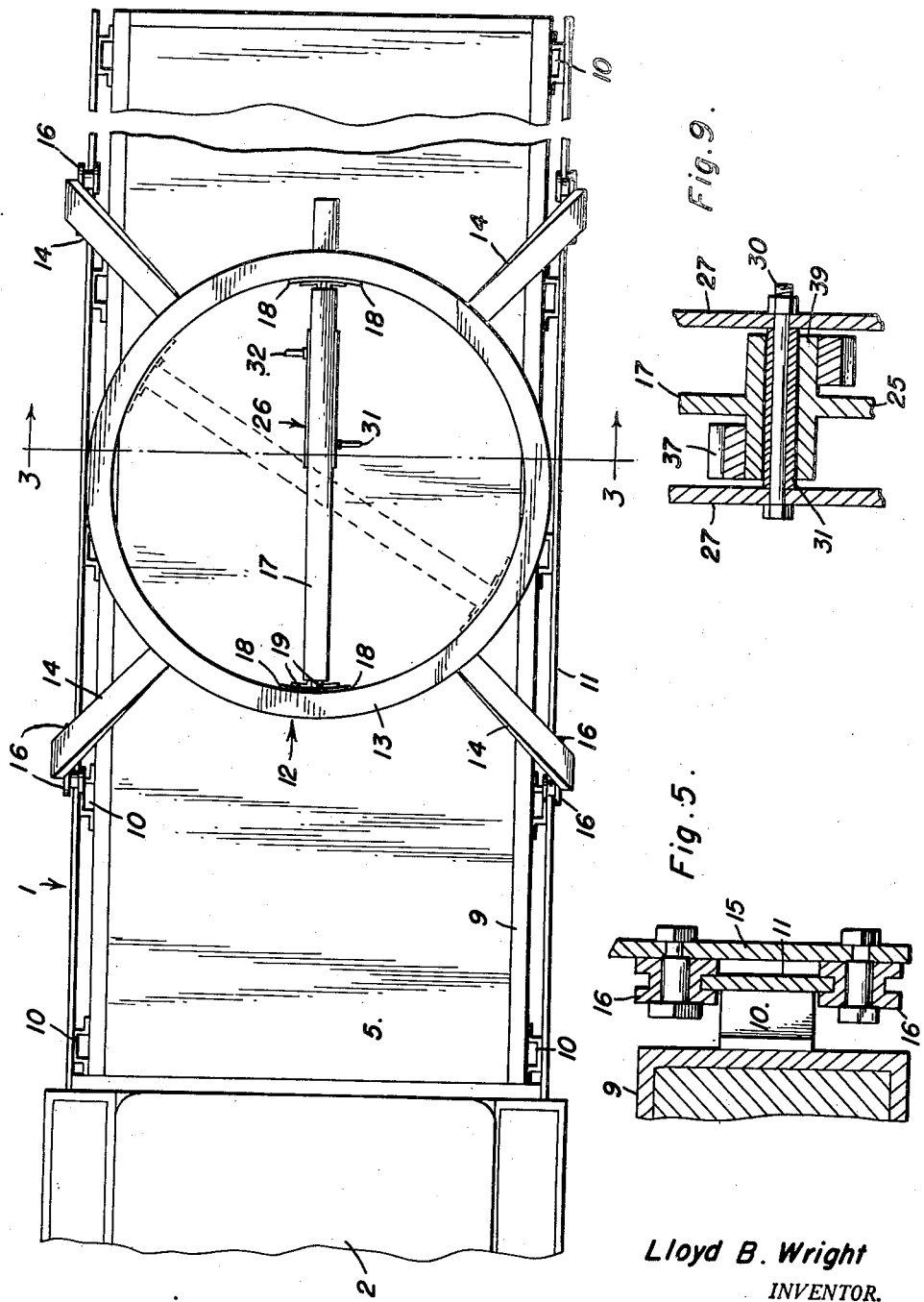

March 7, 1950 L. B. WRIGHT 2,499,442
UNLOADING APPARATUS FOR AUTOMOTIVE TRUCKS
Filed Dec. 12, 1947 3 Sheets-Sheet 3
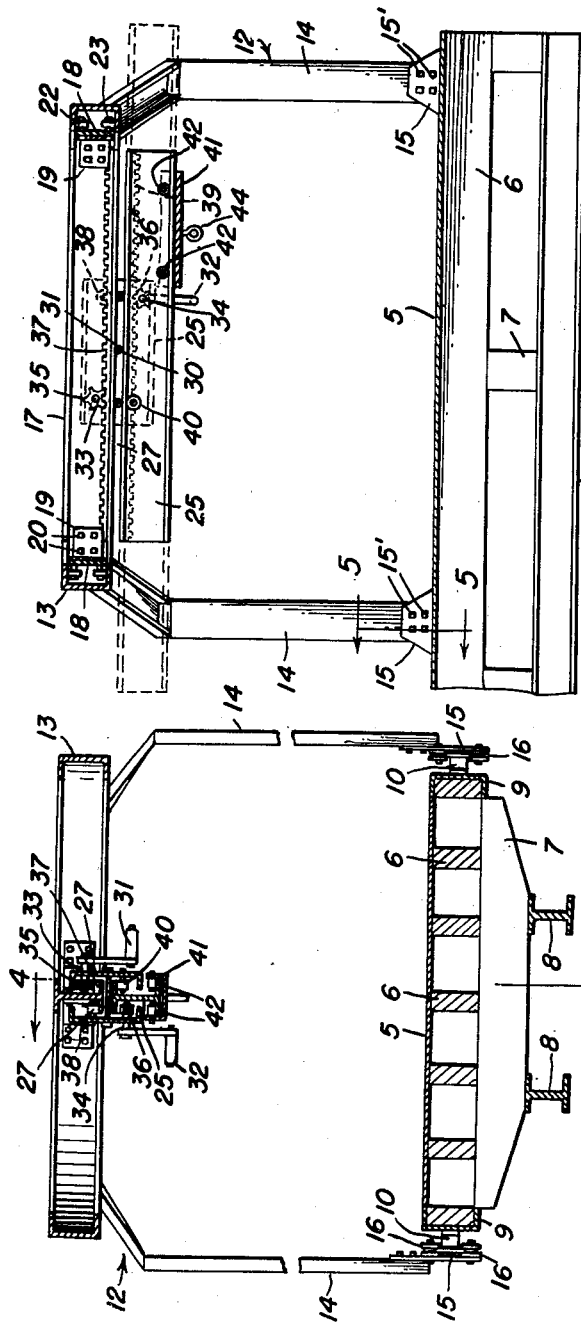
Lloyd B. Wright
INVENTOR.
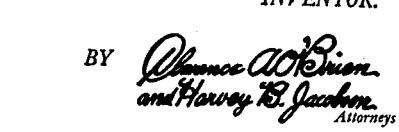
Attorneys Patented Mar. 7, 1950

2,499,442

UNITED STATES PATENT OFFICE 2,499,442

UNLOADING APPARATUS FOR AUTOMOTIVE TRUCKS

Lloyd B. Wright, Seattle, Wash.

Application December 12, 1947, Serial No. 791,239

5 Claims. (Cl. 214—65)

My invention relates to improvements in unloading apparatus for automotive trucks of the flat bed type, especially, although not necessarily.

The primary object of my invention is to provide a simply constructed, easily handled, apparatus adapted for installation on present day flat bed automotive trucks without changing the truck and which is especially designed for unloading from either side or the back of the beds at different locations along the same.

Another object is to provide apparatus of the character and for the purpose above set forth which is well-adapted to withstand long use, requires a minimum of servicing, and is comparatively inexpensive to manufacture and install.

Other and subordinate objects, also within the purview of my invention, together with the precise nature of my improvements, will be readily understood when the succeeding description and claims are read with reference to the drawings accompanying and forming part of the specification.

In said drawings:

Figure 1 is a view in side elevation of a flat bed automotive truck equipped with my improved unloading apparatus in a preferred embodiment thereof;

Figure 2 is a view in plan drawn to a larger scale and partly broken away;

Figure 3 is a view in vertical transverse section taken on the line 3—3 of Figure 2;

Figure 4 is a view in vertical longitudinal section taken on the line 4—4 of Figure 3;

Figure 5 is a fragmentary view in vertical section taken on the line 5—5 of Figure 4 and drawn to a larger scale;

Figure 6 is a fragmentary view in perspective of the turn table member and the annular track broken away to show the means for mounting said member on said track;

Figure 7 is a fragmentary view in vertical transverse section taken on the line 7—7 of Figure 6 and drawn to a larger scale;

Figure 8 is a fragmentary view in perspective, partly in section, of the turn table member, crane arm, and the crane arm carriage partly broken away;

Figure 9 is a fragmentary view in vertical transverse section of the side cheek plates of the crane arm carriage, the turn table member, and the crane arm illustrating the rack bars on the turn table member and crane arm and one of the bolts and the spacing sleeve for securing the cheek plates together.

Referring to the drawings by numerals, the automotive truck 1 shown as equipped with my improved apparatus is of the well-known four wheel drive type embodying a driver's cab 2, front steering wheels 3, rear driving wheels 4 and a flat bed 5 in the rear of the cab 2. The bed 5 is supported by longitudinal bed beams 6 with underlying cross bolsters 7 mounted on chassis side bars 8. Channel beams 9 extending along the sides of the bed 5 are provided with the usual longitudinally spaced socket straps 10 for attaching side stakes, not shown, to said bed. Flat rails for protective purposes extend alongside the beams 9 and are suitably attached to the straps 10 with upper and lower edges free so that the same are available for use as track rails 11 extending along the sides of the bed 5 in spaced relation thereto.

According to my invention, a main carriage 12 is provided to travel longitudinally of the bed 5 and comprises an annular channel iron track 13 of at least the same outside diameter as the overall width of the bed 5, and with the channel innermost, said track being supported at a suitable height above the bed 5, and centered in the longitudinal center of said bed, by channel iron legs 14 extending from the outer side of the track 13 in 90 degree angular relation around the same to form pairs at opposite sides of the bed 5 upstanding for the greater portion of their length perpendicular to the plane of said bed.

Foot plates 15 to which the lower ends of said legs 14 are suitably secured by bolts 15' extend in upright position along the outer sides of the track rails 11 and are equipped with upper and lower grooved rollers 16 running on the free longitudinal edges of the track rails 11, as best shown in Figure 5, so that the carriage 12 may be shoved back and forth along said bed 5.

An I-beam turn table member 17 is mounted in the annular track 13, diametrically thereof, to revolve sidewise horizontally in the same and by means of a pair of arcuate end plates 18 and angle plates 19, best shown in Figure 6, bolted to opposite sides of said beam, as at 20, and together, as at 21, the end plates 18 having upper and lower rollers 22, 23 thereon fitting in the channel of said track 13. The rollers 21, 22 are mounted on the plates 18 by bolts 24 with a spacing sleeve, as at 24', on said bolts between said rollers 21 and plates 18 as shown for instance in Figure 7.

Beneath the I-beam turn table member 17 and parallel therewith is an I-beam crane arm 25 suspended from said member 17 for endwise traveling movement horizontally relative to the main carriage 12 by means of a crane arm carriage 26 now to be described.

The crane carriage 26, as best shown in Figure 8, comprises a pair of channel side plates 27 parallel to the turn table member 17 and crane arm 25 and spaced apart laterally upon opposite sides of said member 17 and crane arm 25, with channel sides facing, and upper and lower flanges 28, 29 extending into the channels of said member 17 and said crane arm 25 for a purpose presently seen. Cross bolts, as at 30, extending between the turn table member 17 and the crane arm 25, with spacing sleeves 31 thereon, as shown in Figure 9, secure said plates 27 together in laterally spaced relation. At each end thereof, and upon opposite sides of the same, the crane arm carriage 26 is provided with a hand crank, designated at 31, 32, respectively, and best shown in Figure 3. The hand cranks 31, 32 are fastened on horizontal shafts 33, 34 journalled in the cheek plates 27. The shafts 33, 34 have fastened thereon gear pinions 35, 36. The gear pinion 36 meshes with a rack bar 37 on the bottom flange of the turn table member 17 and thereby serves to suspend the crane carriage 26 at one end from said member 17 on one side thereof. A roller 38 in said carriage 26 at the other end thereof rides on the bottom flange of the turn table member 17 and suspends said carriage 26 at the other end thereof from said member 17 on the other side thereof. The gear pinion 36 on the shaft 34 meshes with a rack bar 39 on the upper flange of the crane arm 25, at one side of said arm, and which is best shown in Figure 8. A roller 40 in said carriage 26 at the end thereof opposite the gear pinion 36 rides against the upper flange of the crane arm 25.

As will now be seen, the crane arm carriage 26 is suspended on the lower flange of the turn table member 17 at opposite sides and ends of said carriage by the gear pinion 35 and the roller 38, and said carriage 26 may be caused to travel along the turn table member 17 by operation of the hand crank 31 to feed the crane arm 25 with said carriage 26 endwise along said member 17. The crane arm 25 is suspended from the crane arm carriage 26 by the gear pinion 36 and the roller 40 and may be fed endwise in said carriage 26 by operation of the hand crank 32 so that said crane arm 25 is endwise movable relative to the crane arm carriage 26, or, in other words, independently of said carriage.

A chain hoist carriage 41 of channel bar construction travels on the bottom flange of the crane arm 25 with rollers 42 thereon riding on the bottom flange, whereby said carriage 41 may be rolled along said crane arm 25.

A chain hoist 43, of the usual construction, is suspended by an I-bolt 44 from the bottom of the chain hoist carriage 41.

The manner in which my invention is designed to be used and operated will be readily understood. Suffice it to explain, as an example, that with a load, not shown, attached to the chain hoist 43 and lifted clear of the bed 5 thereby, the main carriage 12 may be rolled along the bed 5 for unloading at a desired point along the bed 5 or at the rear of said bed. The turn table member 17 may be revolved to position the crane arm 25 for projection beyond the selected side, or the end of said bed 5. The chain hoist carriage 41 may then be rolled along the crane arm 25 to run the load to whichever end of the crane arm 25 that it is desired to use as an unloading end. The crane arm carriage 26 may be fed by operation of the hand crank 31 toward said end of the crane arm 25 as far as desired. The crane arm 25 may be fed independently of the crane arm carriage 26 to extend the same outwardly beyond the selected side, or the rear end of the bed 5 to the extent desired and by operation of the hand crank 32. Such operations may be varied and other operations perform with the described apparatus, as will be manifest, but it is not deemed necessary to a proper understanding of the invention to describe the same.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described my invention, what is claimed as new is:

1. Apparatus of the class described comprising a main carriage including side pairs of legs adapted to be mounted at lower ends thereof at opposite sides of a truck bed for rolling of said carriage along said bed, an annular horizontal track supported by said legs, a turntable member mounted in said track to be revolved therein, a crane arm carriage movable on said turntable member horizontally, a crane arm suspended by said carriage for endwise movement horizontally therewith and endwise movable independently in the same, a hoist, and means to mount said hoist on said crane arm.

2. Apparatus of the class described comprising a main carriage including side pairs of legs adapted to be mounted at lower ends thereof at opposite sides of a truck bed for rolling of said carriage along said bed, an annular horizontal track supported by said legs, a turntable member mounted in said track to be revolved therein, a crane arm carriage movable on said turntable member horizontally, a crane arm suspended by said carriage for endwise movement horizontally therewith and endwise movable independently in the same, a hoist, and means to mount said hoist on said crane arm comprising a hoist carriage mounted on said crane arm to travel along the same.

3. Apparatus of the class described comprising a main carriage including side pairs of legs adapted to be mounted at lower ends thereof at opposite sides of a truck bed for rolling of said carriage along said bed, an annular horizontal track supported by said legs, a turntable member mounted in said track to be revolved therein, a crane arm carriage movable on said turntable member horizontally, a crane arm suspended by said carriage for endwise movement horizontally therewith and endwise movable independently in the same, a hoist, means to mount said hoist on said crane arm, and crank operative means for moving said carriage.

4. Apparatus of the class described comprising a main carriage including side pairs of legs adapted to be mounted at lower ends thereof at opposite sides of a truck bed for rolling of said carriage along said bed, an annular horizontal track supported by said legs, a turntable member mounted in said track to be revolved therein, a crane arm carriage movable on said turntable horizontally, a crane arm suspended by said carriage for endwise movement horizontally therewith and endwise movable independently in the same, crank operative means for moving said carriage, and crank operative means for moving said crane arm independently.

5. Apparatus of the class described comprising a main carriage including side pairs of legs adapted to be mounted at lower ends thereof at opposite sides of a truck bed for rolling of said carriage along said bed, an annular horizontal track supported by said legs, a turntable member mounted in said track to be revolved therein, a crane arm carriage movable on said turntable horizontally, a crane arm suspended by said carriage for endwise movement horizontally therewith and endwise movable independently in the same, crank operative means for moving said carriage, crank operative means for moving said crane arm independently, a hoist, and a hoist carriage mounted on said crane arm to travel along the same.

LLOYD B. WRIGHT.

REFERENCES CITED

The following references are of record in the file of this patent:

UNITED STATES PATENTS

| Number | Name | Date |
|---|---|---|
| 1,670,733 | Moore | May 22, 1928 |
| 1,748,708 | Fitch | Feb. 25, 1930 |
| 2,156,424 | Barnard | May 2, 1939 |
| 2,292,870 | Dixon | Aug. 11, 1942 |
| 2,424,899 | Priester | July 29, 1947 |